United States Patent
Maher, III et al.

(10) Patent No.: US 6,741,595 B2
(45) Date of Patent: May 25, 2004

(54) DEVICE FOR ENABLING TRAP AND TRACE OF INTERNET PROTOCOL COMMUNICATIONS

(75) Inventors: Robert Daniel Maher, III, Plano, TX (US); James Robert Deerman, Lucas, TX (US); Milton Andre Lie, McKinney, TX (US)

(73) Assignee: Netrake Corporation, Plano, TX (US)

( * ) Notice: Subject to any disclaimer, the term of this patent is extended or adjusted under 35 U.S.C. 154(b) by 0 days.

(21) Appl. No.: 10/167,311

(22) Filed: Jun. 11, 2002

(65) Prior Publication Data

US 2003/0227917 A1 Dec. 11, 2003

(51) Int. Cl.[7] .................... H04L 12/28; H04L 12/56
(52) U.S. Cl. .................. 370/392; 370/432; 370/428; 455/455
(58) Field of Search ............... 370/235, 328, 370/338, 352, 353, 389, 355, 390, 401, 428, 329, 232, 392, 409, 395, 474, 252; 455/455, 575, 525, 430, 456

(56) References Cited

U.S. PATENT DOCUMENTS

| | | | |
|---|---|---|---|
| 6,188,689 B1 * | 2/2001 | Katsube et al. | ............. 370/389 |
| 6,452,915 B1 * | 9/2002 | Jorgensen | .................... 370/338 |
| 2002/0080786 A1 * | 6/2002 | Roberts | ....................... 370/389 |
| 2003/0142681 A1 * | 7/2003 | Chen et al. | .................. 370/401 |

* cited by examiner

Primary Examiner—Afsar Qureshi
(74) Attorney, Agent, or Firm—Craig J. Cox

(57) ABSTRACT

A network processing system is described that is able to monitor IP network traffic, including the ability to perform trap and trace on IP communications flowing over the IP network. The network processing system is able to scan the entire contents of data packets passing through it, and to associate related data packets into discrete sessions, or flows, which allows the network processing system to search for predetermined search criteria contained within those flows. If a flow is found to contain a predetermined search criteria, the network processing system is able to maintain a record of the flow or to replicate the flow and save it or send it to another IP address for monitoring. The monitoring of a flow can include the entire contents of the flow, or any subset of information in the flow such as call identifying information.

16 Claims, 8 Drawing Sheets

DEVICE FOR ENABLING TRAP AND TRACE OF INTERNET PROTOCOL COMMUNICATIONS

TECHNICAL FIELD OF THE INVENTION

The present invention relates to broadband data networking equipment. Specifically, the present invention relates to a network processing system that is able to intercept communication streams and communication identifying information in Internet Protocol (IP) networks.

BACKGROUND OF THE INVENTION

The power of internet protocol (IP) networks, such as the Internet, is their connectionless method of transporting data from source to destination and their ability to carry all services over a single network. Increasingly, there is a push to "collapse" the exiting and separate voice and data network into a single IP network by implementing voice over IP (VoIP) on the same network that carries data traffic. Once of the many problems in using VoIP to carry telephone calls is compliance with wiretapping laws such as the Communications Assistance for Law Enforcement Act of 1994, commonly referred to as CALEA.

In applying CALEA to VoIP, there are a number of technological hurdles. VoIP is becoming reliable and robust, but it is not easily monitored. In a circuit-switched network there are physical locations to tap into, but VoIP, like any IP communications, is connectionless, meaning it has to be tapped at a network aggregation point, and has to be anchored to the monitoring device through means such as packet anchoring using network address translation. Additionally, there must be a mechanism to separate the identifying information associated with the call from the substance of the communication itself, for example for a VoIP call there must be a mechanism for retrieving only the caller's phone number or IP address without providing access to the actual voice content of the call. Other requirements involve the interception of conference calls, both subject initiated and party hold, join, and drop.

Accordingly, what is needed is a network processing system that is able to intercept IP communications, provide identifying information separately from content, and provide detailed records of the communication.

SUMMARY OF THE INVENTION

A network processing system is described that is able to monitor IP traffic flowing over a network. The network processing system includes a learning state machine made up of a traffic flow processor and a quality of service processor. The traffic flow processor associates each data packet with a corresponding flow or session so that the system is able to treat data packets based on the characteristics of the entire flow and not just the characteristics of individual data packets. The flows, made up of their associated data packets are compared to a database of known signatures, the database including a predetermined set of search criteria. When a match is found between a flow and a search criterion, the network processing system is operable to monitor the flow. The monitoring can take many forms, including, but not limited to, replicating the flow, or extracting information from the flow such as identifying information. The replicated flow, or extracted information can then either be stored for later retrieval or sent real time to an IP address designated by law enforcement.

The traffic flow processor includes a header preprocessor that examines the header information of each data packet in the flow, and a content processor that is able to examine the contents of any individual data packet or flow by comparing it to the database of known signatures.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
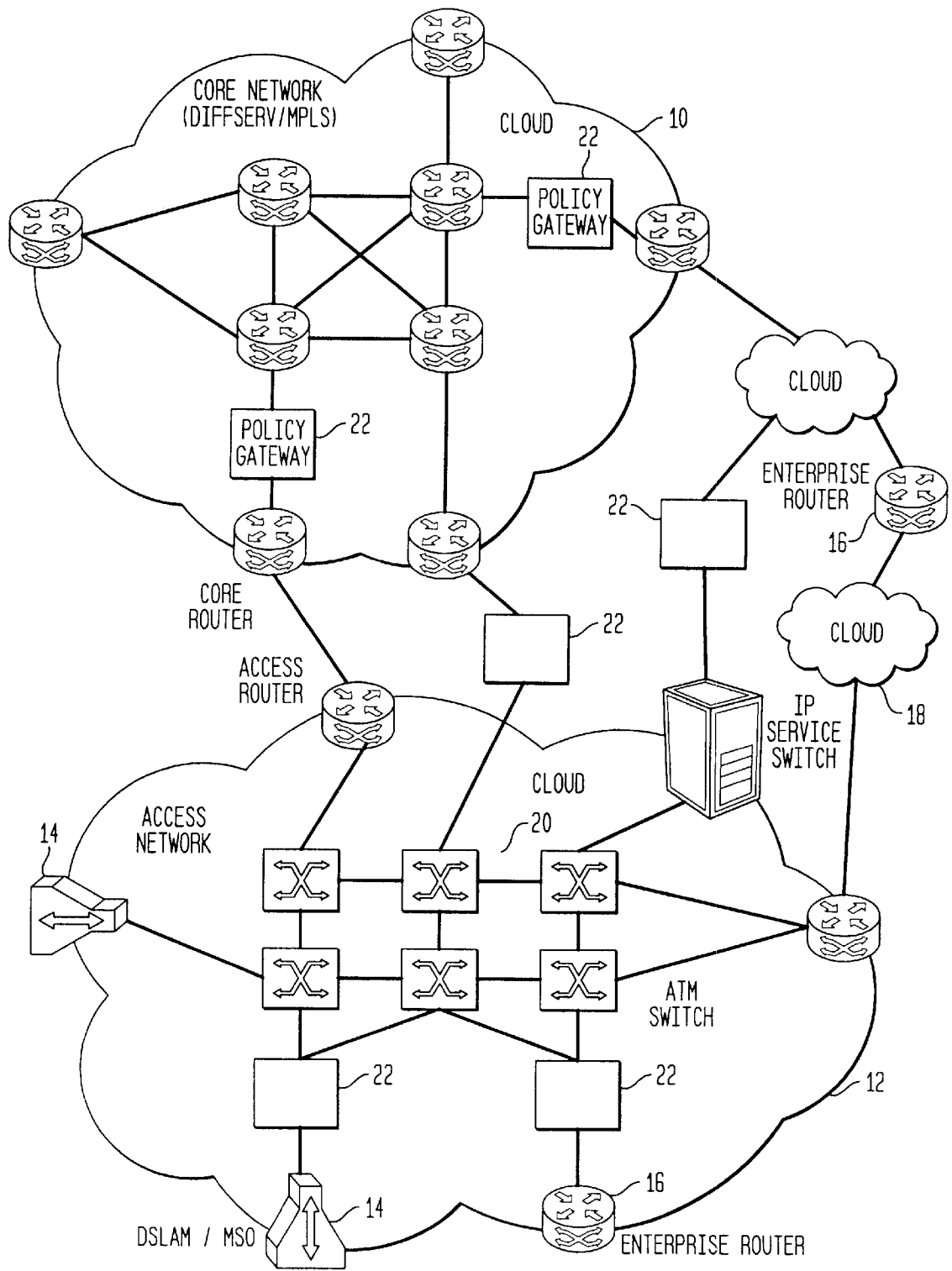
FIG. 1 is a network topology diagram illustrating example network structures in which the present invention can operate.

Referring now to FIG. 1, a network topology is shown which is an example of network infrastructures that exist within a broader public IP network such as the internet. FIG. 1 is in no way meant to be a precise network architecture, but only to serve as a rough illustration of a variety of network structures which can exist on a broadband IP network. FIG. 1 shows a core IP network 10 which can be the IP network of a company such as MCI or UUNET, and an access network 12, which connects users through equipment such as DSLAMs 14 or enterprise routers 16 to the core IP network 10. An endless variety of network structures can be connected to core IP network 10 and access network 12 in order to access other networks connected to the public IP network, and these are represented here as clouds 18.

Access network 12, an example of which would be an Internet Service Providers (ISPs) or Local Exchange Carriers (LECs), is used to provide both data and voice access over the public IP network. Access network 12 can provide services for enterprises through enterprise routers 16, for example company networks such as the company network for Lucent Technologies or Merrill Lynch, or for individual homes, home offices, or small businesses through dial-up or high speed connections such as digital subscriber lines (DSL) which connect through aggregation devices such as DSLAM 14.

Access network 12 includes a switched backbone 20, shown here as an asynchronous transfer mode (ATM) network, which is formed by switches and routers, to route data over its network. Domain name servers and other networking equipment, which are not shown, are also included in access network 12. Access network 12 provides connections between its own subscribers, and between its subscribers and core IP network 10, and other networks 16, so that its subscribers can reach the customers of other access networks.

It can easily be seen that points exist at the edges of the network structures and between network structures where data is passed across network boundaries. One major problem in the network structures shown in FIG. 1 is the lack of any type of intelligence at these network boundary points which would allow the network to provide services such as security, monitoring of network traffic, IP communications trap and trace, as well as, quality of service, policy enforcement, and statistical metering. The intelligence to provide these services would require that the network identify, learn and understand the IP communications passing through these network boundary points, and not just the destination and/or source information, which is currently all that is understood. Understanding the type of data, or its contents, including the contents of the associated payloads as well as header information, and further understanding and remembering, or maintaining, a state awareness across each individual traffic flow would allow the network to apply specific treatments to packets and flows in real time, such as replicating and redirecting traffic, thereby allowing the network to provide real cross network security and monitoring, as well as, QoS using standards such as MPLS and DiffServ, to configure itself in real time to bandwidth requirements on the network for applications such as VoIP or video where quality of service is a fundamental requirement, or to provide other network services which require intelligence at the session, or flow, level and not just packet forwarding. An intelligent, state-aware network would also be able to identify and filter out other security problems such as email worms, viruses, denial of service (DoS) attacks, and illegal hacking in a manner that would be transparent to end users. Further, the intelligent, state-aware network would provide for metering capabilities by hosting companies and service providers, allowing these companies to regulate the amount of bandwidth allotted to individual customers, as well as to charge precisely for bandwidth and additional features such as security.

An example of the employment of such a device is shown in FIG. 1 by network processing system 22, which resides at the cross network boundaries as well as at the edge of the access network 12 behind the DSLAMs 14 or enterprise routers 16. A device at these locations would, if it were able to learn about flows and events in the network, and to remember state for those flows, be able to apply real quality of service and policy management to networks to which it was connected.

In accordance with the requirements set forth above, the present invention provides for a network processing system that is able to scan, classify, and modify network traffic including payload information at speeds of OC-3, OC-12, OC-48 and greater, thereby providing an effective learning state machine for use in networks.

Figure 2:
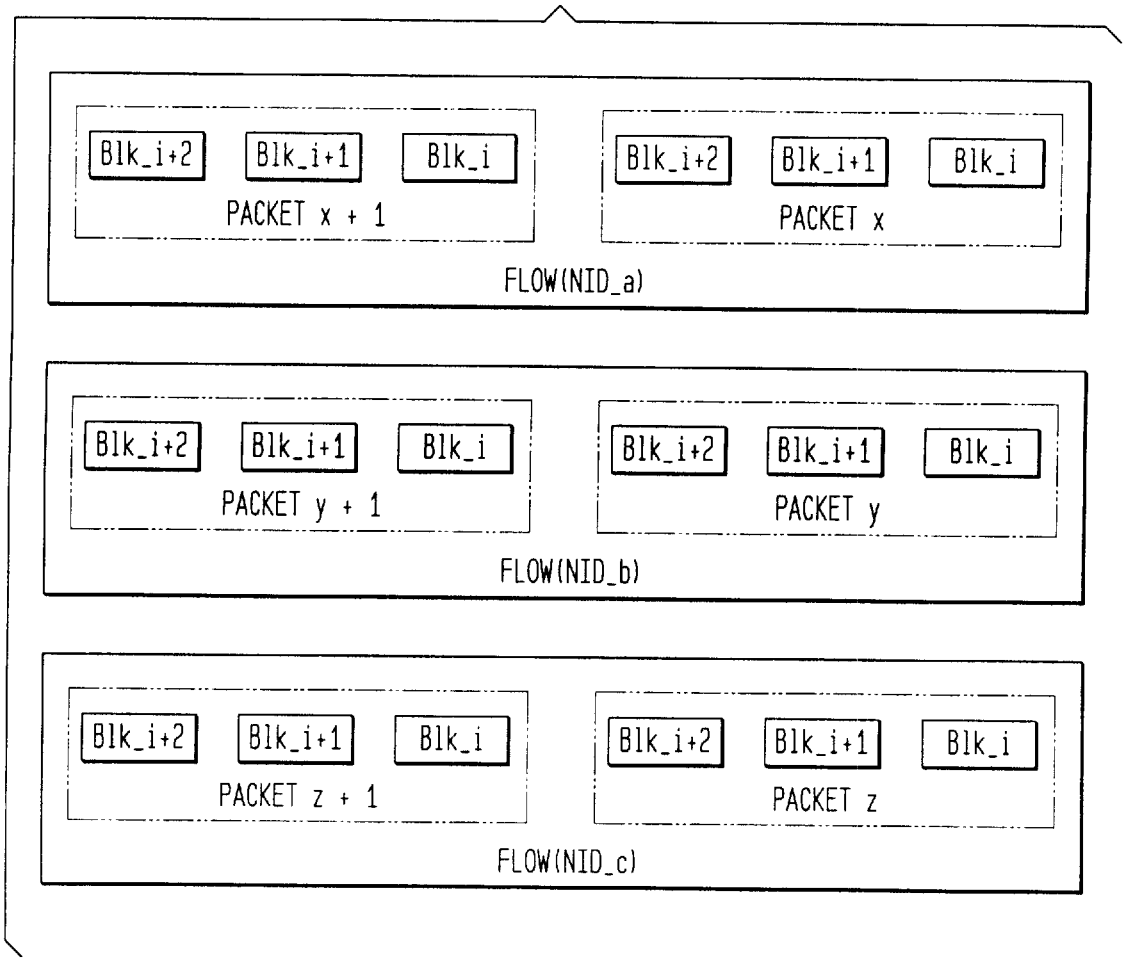
FIG. 2 is a diagram illustrating flow, packet and block concepts used in the present invention.

In order to help understand the operation of the network processing system described herein, FIG. 2 is provided to illustrate concepts relating to network traffic that will be used extensively herein. FIG. 2 shows three individual flows, Flow (NID_a), Flow (NID_b), and Flow (NID_c), which can be simultaneously present on the network. Each flow represents an individual session that exists on the network. These sessions can be real-time streaming video sessions, voice over IP (VoIP) call, web-browsing, file transfers, or any other network traffic. Each flow is made up of individual data packets, packets x and x+1 for Flow (NID_a), packets y and y+1 for Flow (NID_b) and packets z and z+1 for Flow (NID_c). While two packets are shown, each flow is made up of an arbitrary number of packets, and each packet is of an arbitrary size. Each packet can further be broken down into fixed length blocks shown for each packet as Blk_i, Blk_i+1, and Blk_i+2. While packets and flows appear as network traffic, the fixed length blocks shown in FIG. 2 are created by the network processing system of the present invention, and will be described with greater detail below.

Figure 3:
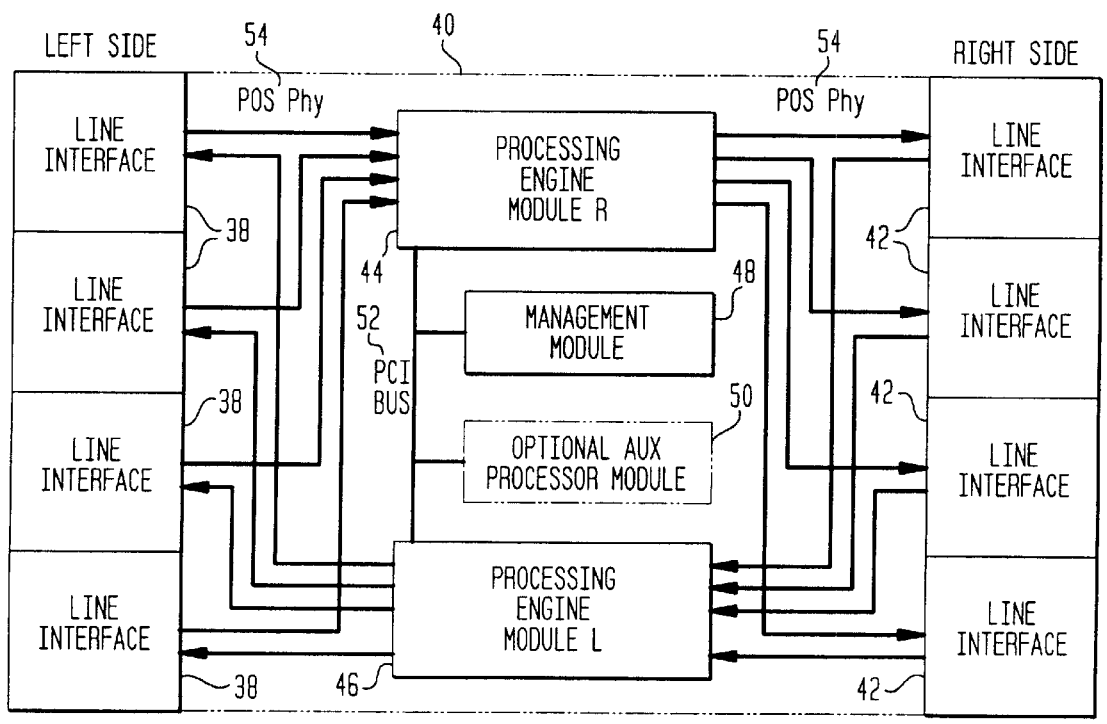
FIG. 3 is a block diagram of a network processing system according to the present invention.

Referring now to FIG. 3, one embodiment of a network processing system according to the present invention is shown. Network processing system 40 is a bi-directional system that can process information from either right line interfaces 42 which is then transmitted back onto the network through left line interfaces 38, or from left line interfaces 38 which is then transmitted back onto the network through right lines interfaces 42. Both left and right line interfaces 38 and 42 respectively, can consist of any plurality of ports, and can accept any number of network speeds and protocols, including such high speeds as OC-3, OC-12, OC-48, and protocols including 10/100 Ethernet, gigabit Ethernet, and SONET.

Figure 4:
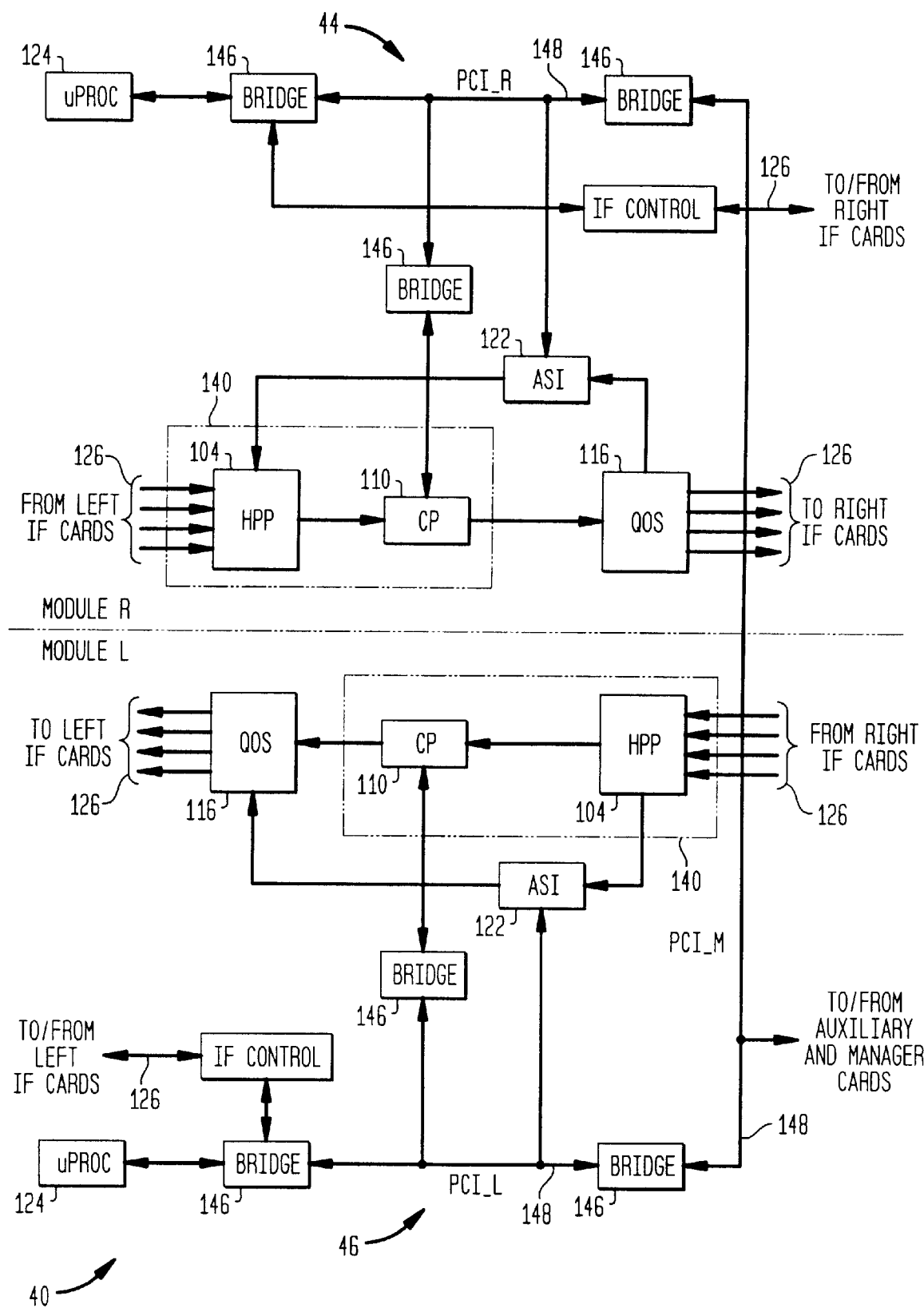
FIG. 4 is a block diagram of the processing engines shown in FIG. 3.

The line interface cards take the incoming data in the form of packets and place the data on a data bus 54 which is preferably an industry standard data bus such as a POS-PHY Level 3, or an ATM UTOPIA Level 3 type data bus. Data received on left line interfaces 38 is sent to learning state machine, or processing engine 44, while data received on right line interfaces 42 is sent to learning state machine, or processing engine 46. While network processing system 40 is bi-directional, individual learning state machines 44 and 46 within network processing system 40 are unidirectional, requiring two to process bi-directional information. Each learning state machine 44 and 46, the operation of which will be described in greater detail with reference to FIG. 4, is operable to scan the contents of each data packet, associate the data packet with a particular flow, determine the treatment, such replicating and redirecting, for each data packet based on its contents and any state for the associated flow, and queue and modify the data packet to conform to the determined treatment. The state for flows is the information related to that flow that has been identified by network processing system 40 from packets associated with the flow that have already been processed.

An internal bus 52, which is preferably a PCI bus, is used to allow learning state machines 44 and 46 to communicate with each other, and to allow management module 48 and optional auxiliary processor module 50 to communicate with both learning state machines 44 and 46. Intercommunication between learning state machines 44 and 46 allows the processing engines to exchange information learned from a flow that can be applied to the treatment for the return flow. For example, treatment for a high-priority customer needs to be applied to both outgoing and incoming information. Since each learning state machine is unidirectional, to affect both directions of traffic, information must be shared between learning state machines.

Management module 48 is used to control the operation of each of the learning state machines 44 and 46, and to communicate with external devices which are used to load network processing system 40 with monitoring, policy, QoS, and treatment instructions that network processing system 40 applies to the network traffic it processes.

Referring now to FIG. 4, one embodiment of a content processing engine used in the network processing system according to the present invention is shown. Each of the learning state machines 44 and 46 are identical as discussed, and the operation of each will be discussed generally and any description of the operation of the processing engines will apply equally to both learning state machines 44 and 46. Line interface cards 42 and 38, shown in FIG. 3, take the data from the physical ports, frames the data, and then formats the data for placement on fast-path data bus 126 which, as described, is preferably an industry standard data bus such as a POS-PHY Level 3, or an ATM UTOPIA Level 3 type data bus.

Fast-path data bus 126 feeds the data to traffic flow scanning processor 140, which includes header preprocessor 104 and content processor 110. The data is first sent to header preprocessor 104, which is operable to perform several operations using information contained in the data packet headers. Header preprocessor 104 stores the received data packets in a packet storage memory associated with header preprocessor 104, and scans the header information. The header information is scanned to identify the type, or protocol, of the data packet, which is used to determine routing information and to decode the IP header starting byte. As will be discussed below, the learning state machine, in order to function properly, needs to reorder out of order data packets and reassemble data packet fragments. Header preprocessor 104 is operable to perform the assembly of asynchronous transfer mode (ATM) cells into complete data packets (PDUs), which could include the stripping of ATM header information.

After data packets have been processed by header preprocessor 104 the data packets, and any conclusion formed by the header preprocessor are sent on fast-data path 126 to the other half of traffic flow scanning engine 140, content processor 110. The received packets are stored in packet storage memory (not shown) while they are processed by content processor 110. Content processor 110 is operable to scan the contents of data packets received from header preprocessor 104, including the entire payload contents of the data packets. The header is scanned as well, one goal of which is to create a session id using predetermined attributes of the data packet. The session id allows individual packets to be associated with their corresponding flows, or sessions.

In the preferred embodiment, a session id is created using session information consisting of the source address, destination address, source port, destination port and protocol, although one skilled in the art would understand that a session id could be created using any subset of fields listed, or any additional fields in the data packet, without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104, the session id can be created anywhere in traffic flow scanning engine 140 including in content processor 110.

The contents of any or all data packets are compared to a database of known signatures, and if the contents of a data packet, or packets, match a known signature, an action associated with that signature and/or session id can be taken by the processing engine. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network processing system 40 to act not only based on the content of the data packets being scanned but also based on the contents of the entire traffic flow. The specific operation of content processor 110 will be described with reference to FIG. 5.

Once the contents of the packets have been scanned and a conclusion reached by traffic flow scanning engine 140, the packets and the associated conclusions of either or both the header preprocessor 104 and the content processor 110 are sent to quality of service (QoS) processor 116. QoS processor 116 again stores the packets in its own packet storage memory for forwarding. QoS processor 116 is operable to perform the traffic flow management for the stream of data packets processed by network processing system 40. QoS processor contains engines for traffic management, traffic shaping and packet modification.

QoS processor 116 takes the conclusion of either or both of header preprocessor 104 and content processor 110 and assigns the data packet to one of its internal quality of service queues based on the conclusion. The quality of service queues can be assigned priority relative to one another, or can be assigned a maximum or minimum percentage of the traffic flow through the device. This allows QoS processor 116 to assign the necessary bandwidth to traffic flows such as VoIP, video and other flows with high quality and reliability requirements, while assigning remaining bandwidth to traffic flows with low quality requirements such as email and general web surfing to low priority queues. Information in queues that do not have the available bandwidth to transmit all the data currently residing in the queue according to the QoS engine is selectively discarded, thereby removing that data from the traffic flow.

The quality of service queues also allow network processing system 40 to manage network attacks such as denial of service (DoS) attacks. Network processing system 40 can act to qualify traffic flows by scanning the contents of the packets and verifying that the contents contain valid network traffic between known sources and destinations. Traffic flows that have not been verified because they are from unknown sources, or because they are new unclassified flows, can be assigned to a low quality of service queue until the sources are verified or the traffic flow is classified as valid traffic. Since most DoS attacks send either new session information, data from spoofed sources, or meaningless data, network processing system 40 would assign those traffic flows to low quality traffic queues. This ensures that the DoS traffic would receive no more than a small percentage (i.e. 5%) of the available bandwidth, thereby preventing the attacker from flooding downstream network equipment.

The QoS queues in QoS processor 116 (there are 64 k queues in the present embodiment of the QoS processor, although any number of queues could be used) feed into schedulers (1024 in the present embodiment), which feed into logic ports (256 in the present embodiment), which send the data to flow control port managers (32 in the present embodiment) which can correspond to physical egress ports for the network device. The traffic management engine and the traffic shaping engine determine the operation of the schedulers and logic ports in order to maintain traffic flow in accordance with the programmed parameters.

QoS processor 116 also includes a packet modification engine, which is operable to modify, add, or delete bits in any of the fields of a data packet. This allows QoS processor 116 to change DiffServ bits, or to place the appropriate MPLS shims on the data packets for the required treatment. The packet modification engine in QoS processor 116 can also be used to change information within the payload itself if necessary. Data packets are then sent along fast-data path 126 to output to the associated line interfaces, where it is converted back into an analog signal and placed on the network.

As with all network equipment, a certain amount of network traffic will not be able to be processed along fast-data path 126. This traffic will need to be processed by on-board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through the processing engine 40. Bridges 146 are used between elements to act as buffers on PCI buses 148 in order to prevent the loss of data that could occur during a flood of the PCI bus.

As can be seen from the description of FIG. 4, learning state machines 44 and 46 allow the entire contents of any or all data packets received to be scanned against a database of known signatures. The scanned contents can be any variable or arbitrary length and can even cross packet boundaries. The abilities of learning state machines 44 and 46 allow the construction of a network device that is intelligent and state-aware, and gives the network device the ability to operate on data packets based not only on the contents of that data packet, but also on the contents of previous data packets from the same flow.

Using these abilities, learning state machines 44 an 46 can be programmed to look for network traffic matching predetermined criteria such as that contained in a law enforcement warrant. The traffic, once identified, can then be replicated in whole, or in part, with the copy being rerouted to another location for review by law enforcement.

Figure 5:
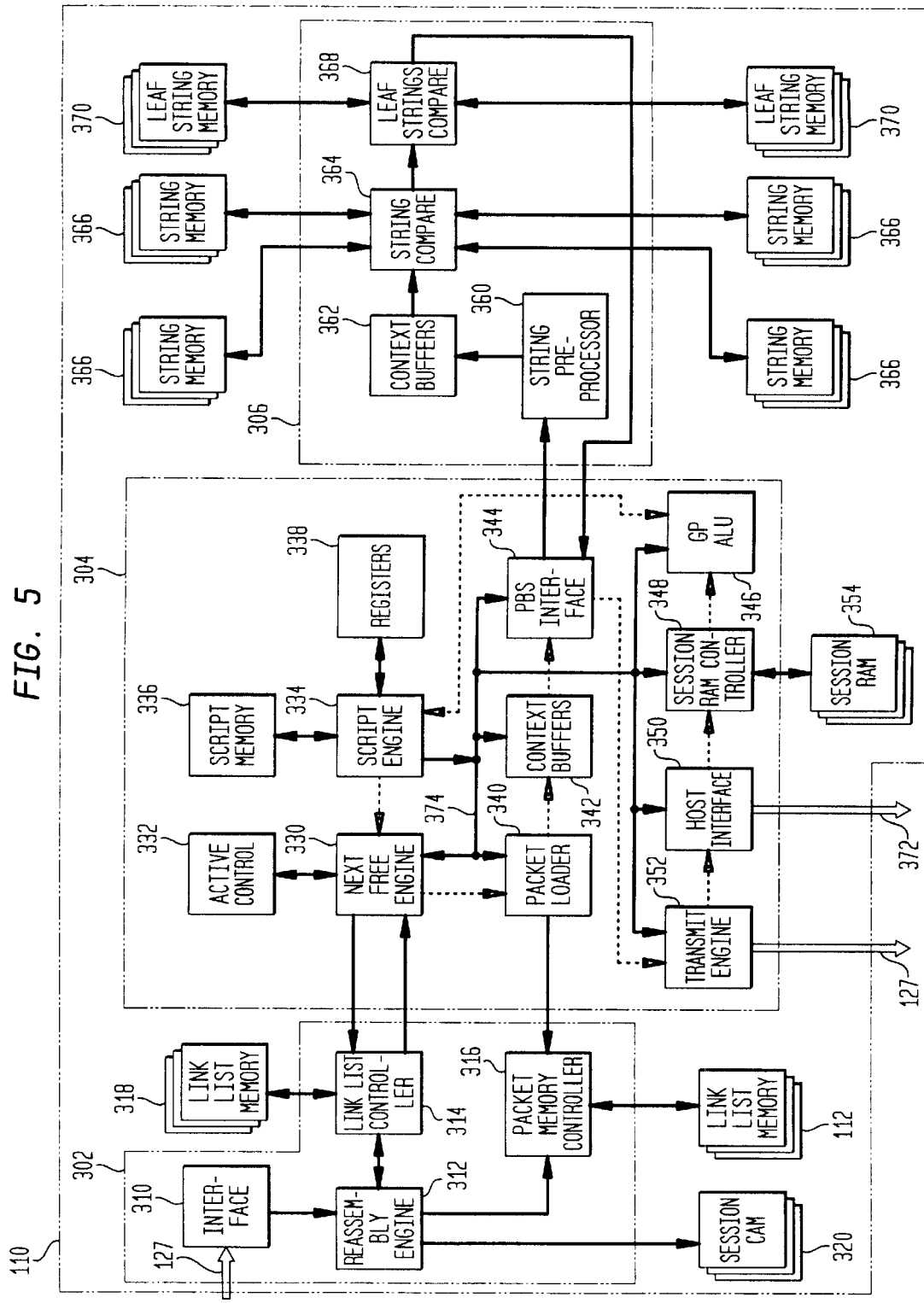
FIG. 5 is a block diagram of the content processor from FIG. 4.

Referring now to FIG. 5, the content processor 110 of FIG. 4 is described in greater detail. As described above, content processor 110 is operable to scan the contents of data packets forwarded from header preprocessor 104 from FIG. 4. Content processor 110 includes three separate engines, queue engine 302, context engine 304, and content scanning engine 306.

Since content processor 110 scans the contents of the payload, and is able to scan across packet boundaries, content processor 110 must be able to reassemble fragmented packets and reorder out of order packets on a per session basis. Reordering and reassembling is the function of queue engine 302. Queue engine 302 receives data off the fast-path data bus 127 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. The data packets are broken into 256 byte blocks for storage within the queue engine 302. Session CAM 320 can store the session id generated by queue engine 302 of content processor 110. Reordering and reassembly engine 312 uses the session id to link data packets belonging to the same data flow.

In order to obtain the high throughput speeds required, content processor 110 must be able to process packets from multiple sessions simultaneously. Content processor 110 processes blocks of data from multiple data packets each belonging to a unique traffic flow having an associated session id. In the preferred embodiment of the present invention, context engine 304 of content processor 110 processes 64 byte blocks of 64 different data packets from unique traffic flows simultaneously. Each of the 64 byte blocks of the 64 different data flows represents a single context for the content processor. The scheduling and management of all the simultaneous contexts for content processor 110 is handled by context engine 304.

Context engine 304 works with queue engine 302 to select a new context when a context has finished processing and has been transmitted out of content processor 110. Next free context/next free block engine 330 communicates with link list controller 314 to identify the next block of a data packet to process. Since content processor 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified, packet loader 340 uses the link list information retrieved by the next free context/next free block engine 330 to retrieve the required block of data from packet memory 112 using packet memory controller 316. The new data block is then loaded into a free buffer from context buffers 342 where it waits to be retrieved by content scanning engine interface 344.

Content scanning engine interface 344 is the interface between context engine 304 and content scanning engine 306. When content scanning engine 306 has room for a new context to be scanned, content scanning engine interface 344 sends a new context to string preprocessor 360 in content scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by string compare 364. String compare 364 controls the input and output to signature memory 366. While four signature memories 366, each of which is potentially capable of handling multiple contexts, are shown any number could be used to increase or decrease the throughput through content scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memories 370 to perform a bit to bit comparison of the context and the potentially matched string. Although four string memories 366 and two leaf string memories 370 are shown, any number of string memories 366 and leaf string memories 370 can be used in order to optimize the throughput of content processor 110.

The conclusion of the content scanning are then sent back to the payload scanning interface 344 along with possibly a request for new data to be scanned. The conclusion of the content scanning can be any of a number of possible conclusions. The scanning may not have reached a conclusion yet and may need additional data from a new data packet to continue scanning in which case the state of the traffic flow, which can be referred to as an intermediate state, and any incomplete scans are stored in session memory 354 along with other appropriate information such as sequence numbers, counters, etc. The conclusion reached by signature memory 366 may also be that scanning is complete and there is or isn't a match, in which case the data packet and the conclusion are sent to transmit engine 352 for passing to QoS processor 116 from FIG. 4. The scanning could also determine that the data packet needs to be forwarded to microprocessor 124 from FIG. 4 for further processing, so that the data packet is sent to host interface 350 and placed on host interface bus 372. In addition to handling odd packets, host interface 350 allows microprocessor 124 to control any aspect of the operation of content processor 110 by letting microprocessor 124 write to any buffer or register in context engine 304.

State information is stored in session memory 354 and is updated as necessary after data associated with the particular traffic flow is scanned. The state could be an intermediate state, representing that the matching is incomplete and additional data is needed to continue the scanning. Also, the state could be a partial state indicating that one or more events have occurred from a plurality of events required to generate a particular conclusion. The state may be a final state indicating that a final conclusion has been reached for the associated traffic flow and no further scanning is necessary. Or, the state may represent any other condition required or programmed into the content processor 110. The state information for each traffic flow, in whatever form, represents the intelligence of network processing system 40 from FIG. 3, and allows the network processing system to act not only on the information scanned, but also on all the information that has been previously scanned for each traffic flow.

The operation of transmit engine 352, host interface 350, session memory controller 348, which controls the use of session memory 354, and of general-purpose arithmetic logic unit (GP ALU) 346, which is used to increment or decrement counters, move pointers, etc., is controlled by script engine 334. Script engine 334 operates to execute programmable scripts stored in script memory 336 using registers 338 as necessary. Script engine 334 uses control bus 374 to send instruction to any of the elements in context engine 304. Script engine 334 or other engines within content processor 110 have the ability to modify the contents of the data packets scanned. For example, viruses can be detected in emails scanned by content processor 110, in which case the content processor can act to alter the bits of an infected attachment, essentially rendering the email harmless.

The abilities of content processor 110 are unique in a number of respects. Content processor 110 has the ability to scan the contents of any data packet or packets for any information that can be represented as a signature or series of signatures. The signatures can be of any arbitrary length, can begin and end anywhere within the packets and can cross packet boundaries. Further, content processor 110 is able to maintain state awareness throughout all of the individual traffic flows by storing state information for each traffic flow representing any or all signatures matched during the course of that traffic flow. Existing network processors operate by looking for fixed length information at a precise point within each data packet and cannot look across packet boundaries. By only being able to look at fixed length information at precise points in a packet, existing network processors are limited to acting on information contained at an identifiable location within some level of the packet headers and cannot look into the payload of a data packet much less make decisions on state information for the entire traffic flow or even on the contents of the data packet including the payload.

Figure 6:
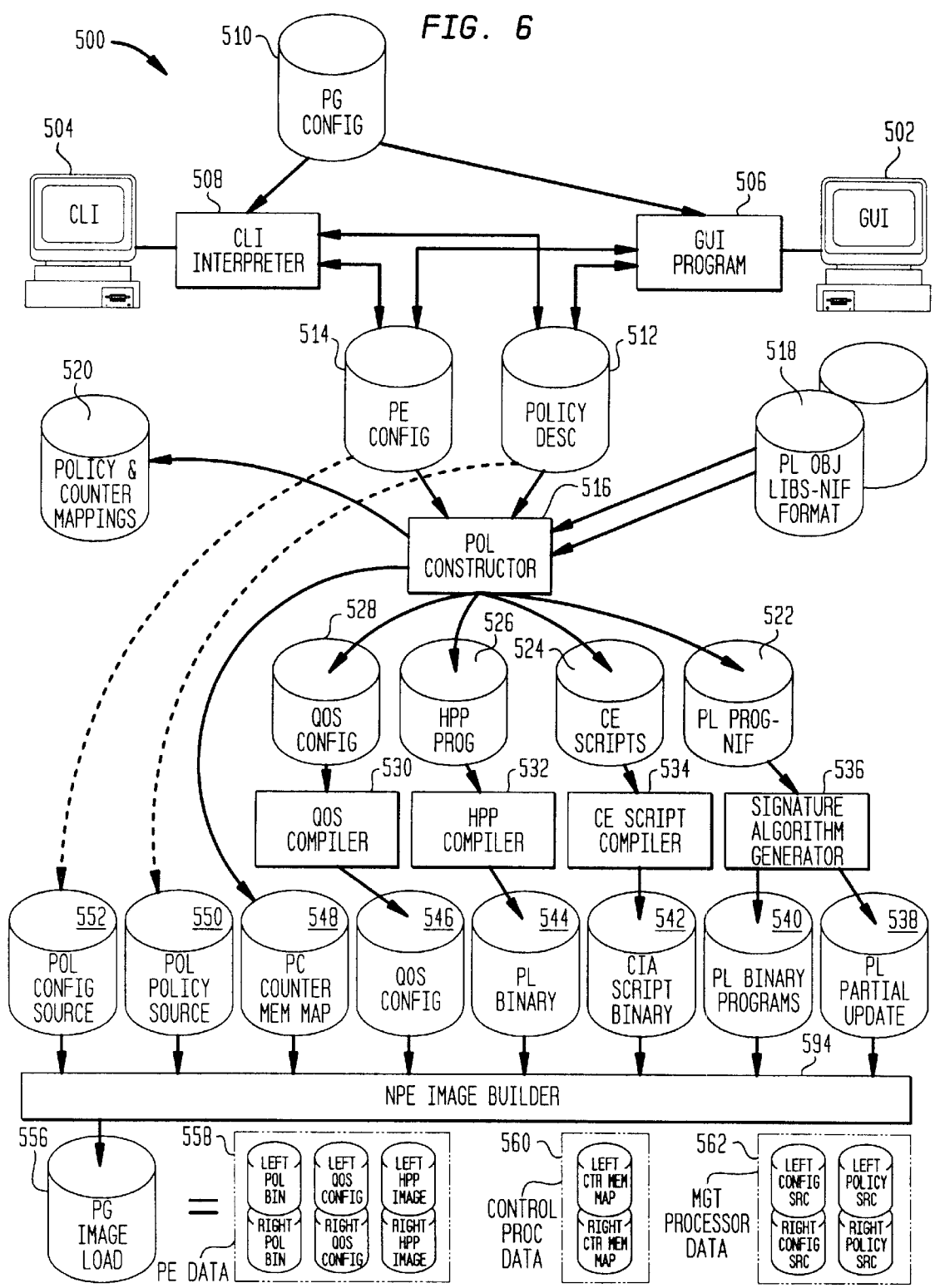
FIG. 6 is a diagram of the image builder used to create the image and configuration files used in the network processing system of the present invention.

Referring now to FIG. 6, a diagram of the software that creates the processor configurations and most importantly the memory images that form the database of signatures in the content processor 110 to which each packet and flow is compared. The software used to build the memory images and configurations is run on a server separate from the network processing system described in FIG. 3. Once created on the separate server, the memory images and configurations are transmitted and downloaded into the network processing system as will be described with reference to FIG. 7.

The network processing system of FIG. 3 is programmable by a user to set the network policies, which it will enforce. The programming is done using policy image builder 500, which is loaded on a separate server, as described. Policy image builder 500 includes a graphical user interface (GUI) 502, and a command line interface (CLI) 504. The functionality of the GUI 502 and CLI 504 are identical and are provided to allow the programmer to choose a preferred interface. A policy gateway configuration database 510 holds information relating to the configuration of each policy gateway, including such information as memory sizes, port numbers, type of line interfaces, etc., to which the programmer has access, and interacts with the CLI interpreter 508 and GUI program 506 to send the new user program to databases holding existing processing engine configuration files 514 and existing policy descriptions 512. The new user program and the existing configurations and descriptions are then combined with object libraries 518 by Policy Object Language (POL) Constructor 516. POL Constructor 516 takes the program and configuration information and produces several maps and configuration files for the individual components of the network processing system.

First, a map of the memory locations inside the network processing engine is produced and stored in memory and counter map 520. Since the network processing system is fully programmable, individual memory locations, counters and registers are assigned functionality by the program. Without a map of the assignments, the data subsequently read from the network processing system would be unintelligible. The memory and counter map produced allows any data produced by the network processing system to be interpreted later.

Additionally, the POL Constructor 516 produces the configuration files for each of the network processing system components. A QoS configuration file 528 is produced that is sent to a QoS compiler 530 and used to produce a QoS configuration image 546. A Header Preprocessor (HPP) program 526 is produced and sent to a HPP compiler 532, which produces an HPP binary file 544. Similarly, a Context Engine script file 524 is produced by POL Constructor 516, which is compiled by context engine script compiler 534 to produce context engine binary file 542. Finally, a signature map file 522 is created that includes the network policy description, and sent to signature algorithm generator 536 which compresses the signature map into an efficient signature memory map 540 in order to more efficiently use the memory in the network processing system. The program also allows for partial updates of the signature memory by using a partial signature memory map 538, which can be used to change only a small part of the signature memory if a full remap of the signature memory is unnecessary.

These four binary files, the QoS configuration file 546, the HPP binary file 544, the context engine binary file 542 and the signature memory map 540 (or partial signature memory map 538, as appropriate) are then combined, along with the processing engine configure source file 552, the policy description source file 550 and the counter and memory map source file 548. The combination is done by the processing engine image builder 554, which produces a policy gateway image load file 556. The policy gateway image load file 556 is the file sent from the separate server to the actual network processing systems to provide the networking processing system with the information and programs necessary to run. The source files are included in the policy gateway image load file 556 to allow the four binary files to be reconstructed and understood from the policy gateway image load file alone, without having to retrace source files in other locations, should anything happen to any part of the network or system.

To understand exactly what is contained in the policy gateway image file 556, the individual components are illustrated as processing engine data 558, control processor data 560, and management processor data 562. Processing engine data 558 contains the left and right signature memory maps for both the left and right processing engines 44 and 46 from FIG. 3, which are loaded into the signature memory of content processors 110 shown in FIG. 4. Processing engine data 558 also contains the left and right configuration files for QoS processors 116 for left and right processing engines 44 and 46, respectively, as shown in FIG. 4. Finally processing engine data 558 contains the left and right header preprocessor image files for header preprocessors 104 for left and right processing engine 44 and 46 respectively.

Control processor data 560 contains left and right counter memory maps which are loaded into microprocessor 124 on each of left and right processing engines, respectively. Finally, management processor data 562 contains the left and right configuration source and the left and right policy source, as described above with reference to processing engine configuration source 552 and policy source 550. These files are stored on management module 48 shown in FIG. 3.

Figure 7:
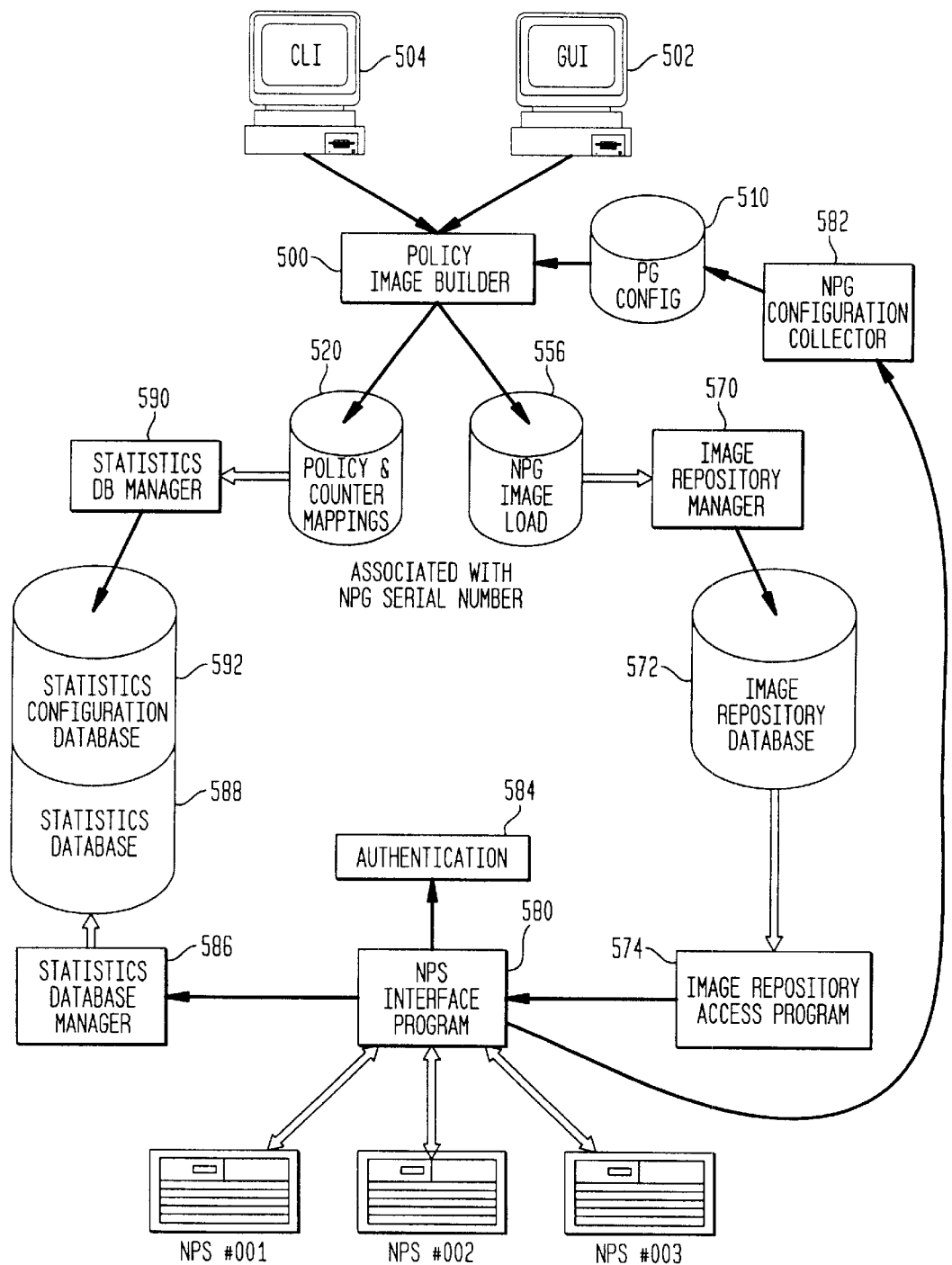
FIG. 7 is a diagram showing the mechanism by which the image files are loaded into and statistical and event information are retrieved from the network processing system of the present invention.

Referring now to FIG. 7, a diagram showing the mechanics of communication with the network processing systems is described. The programs implementing the diagram shown in FIG. 7 also reside on the separate server that includes policy image builder 500 described in FIG. 6. As described above, CLI 504 and GUI 502 are used with configuration files 510 by policy image builder 500 to produce both policy gateway image file 556 and memory and counter map 520. Policy gateway image file 556 is taken by image repository manager 570 and loaded into image repository database 572. Image repository database 572 holds all the policy gateway image files for all of the network processing systems being controlled. Network processing system (NPS) interface program 580 is responsible for the direct communication with each of the network processing systems NPS #001, NPS #002, and NPS #00n being managed. As indicated by NPS#00n, any number of network processing systems can be managed from one separate server. Image repository program 574 takes the proper image file from image repository database 572 and sends it to NPS interface program 580. NPS interface program 580 acts to authenticate each network programming system using authentication program 584 and then sends the policy gateway image file to the appropriate network processing system.

In addition to pushing image files to the network processing systems, NPS interface program 580 acts to pull statistical and event data out of each network processing system by periodically sending each network processing system requests to upload its statistical and event information. When this information is received by NPS interface program it is sent to statistical database manage 586, which stores it in statistics database 588. Statistics database manager 590 uses information out of memory and counter map 520 to place the information necessary to decipher statistics database 588 into statistics configuration database 592. Statistics database 588 and statistics configuration database 592 can then be used to feed information into billing systems to bill for services, and into network management systems to analyze network operations and efficiency.

Figure 8:
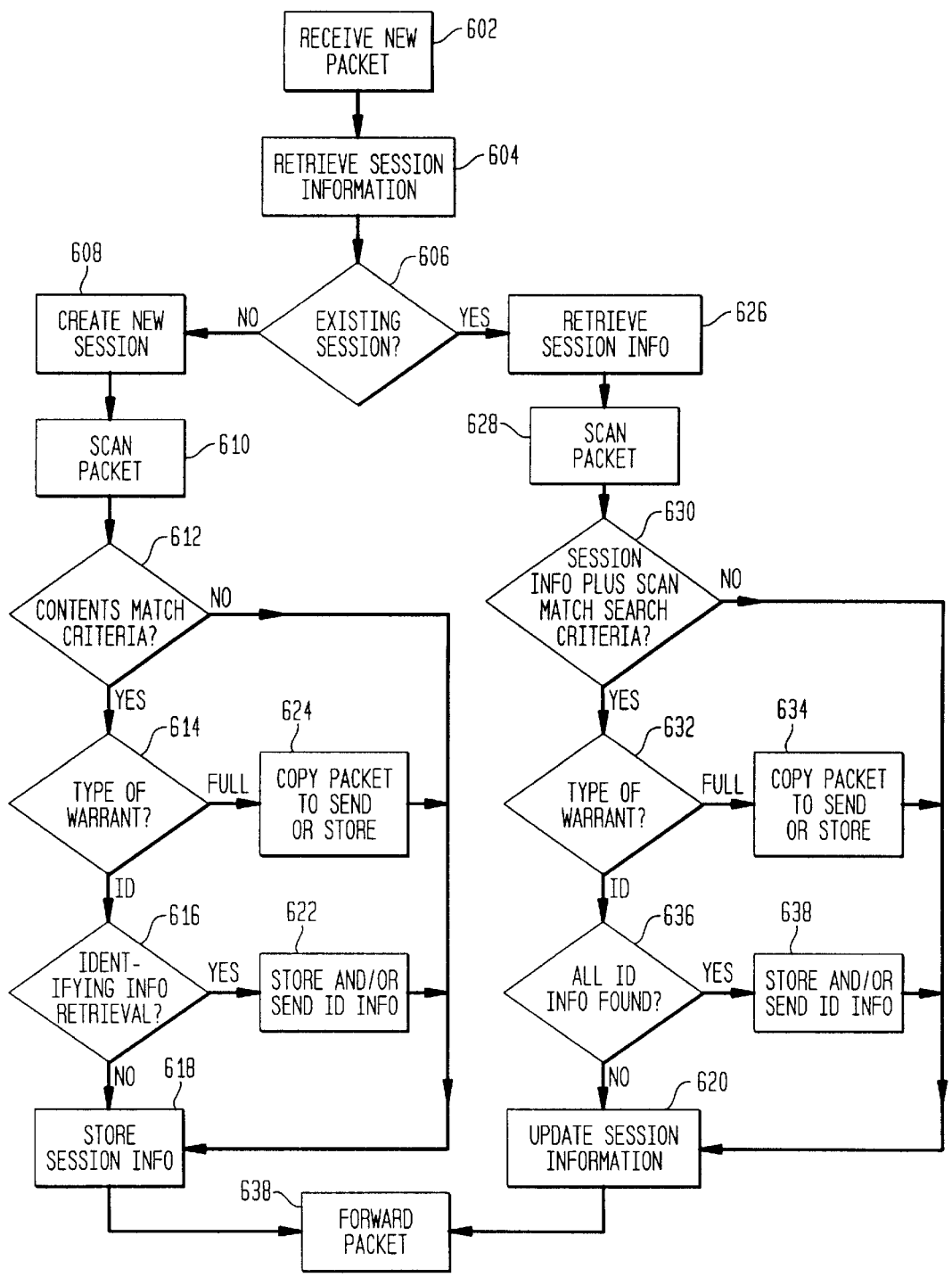
FIG. 8 is a flow chart showing the method used by the present invention to intercept IP communications.

Referring now to FIG. 8, a method 600 for implementing trap and trace functionality over IP networks is described. The method begins when the network processing system receives a new packet as shown in block 602. Using the queue engine 302 from FIG. 5, the predetermined attributes used to determine a session id are retrieved from the packet and a session id is determined as represented by block 604. The process then, in block 606 determines whether the session id of the packet corresponds to an existing session id indicating that the packet belongs to a flow already know to the network processing system.

If the session id does not match an existing session id the process passes to block 608 where the new session id is stored representing a new flow to be processed. The method then passes to block 610, which represents the scanning of the packet by the network processing system of the present invention, specifically by the content scanning engine 306 as described with reference to FIG. 5. Once the packet has been scanned the process passes to block 612, which determines whether the contents of the packet match any of the surveillance criteria. The matching of the surveillance criteria could include partial matches that require further matching to determine how to process the packet. If the packet does not match, wholly or partially, the surveillance criteria, the process passes to block 618 where the session information is stored before the packet is forwarded by the network processing system, as shown in block 638.

Returning to block 612, if the contents of the packet match the search criteria, the process passes to block 614 where it is determined if the type of surveillance is determined. Currently law enforcement may be issued two types of warrants. Either law enforcement officials are allowed to intercept complete communications, or are allowed only to intercept identifying information, such as the source and destination of the call or session, but not the complete contents of the communication. If the warrant authorized full interception of the communication, the process passes to block 624 where the packet is copied or replicated and either sent to a designated site for processing or stored for later retrieval and processing.

If it is determined that the only identifying information is allowed to be intercepted, the process passes to block 616 where it is determined if the packet contains the complete set identifying information required to be intercepted. If not, the process passes to block 618 where an entry is made storing the session information for this new session, and then the packet is forwarded according to block 638. If the identifying information is determined to be complete in block 616, the process passed to block 622 where the identifying information is either stored for later retrieval, or forwarded to a specified location for processing. Next, the process stores the session information, block 618, and forwards the packet, block 638.

Returning now to block 606, the case where the packet belongs to an already identified session is examined. Once the packet is associated with an existing session, or flow, the session information for that flow is retrieved as shown in block 626. The session information contains the determinations about the flow that have been made from previous packets. Next, the process passes to block 628, which represents the scanning of the packet in the context of the session information received. Next, the process in block 630 determines if the scanned packet in conjunction with the session information matches the surveillance criteria. If not the process passes to block 620, which updates the session information before forwarding the packet.

If the scanned packet in conjunction with the session information does match the search criteria, the process passes to block 632 where the type of warrant is determined. If the warrant authorizes an interception of the full communication the process passes to block 634 where the packet is copied to be sent or stored as described with respect to block 624. If only identifying information is authorized to be intercepted, the process instead passes from block 632 to 636, where it is determined whether all of the identifying information has been obtained. If the identifying information has been obtained it is stored or sent, shown by block 638, just as described with reference to block 622. After the intercepted information is stored or sent in blocks 634 and 638, the process updates the session information in block 620 before forwarding the packet, block 638.

Some IP communications, particularly VoIP using SIP protocols, have separate data and control flows. The control flows are used to perform signaling, setup, tear down, and other related functions while the actual communication is carried on the data flow. For example, in a SIP VoIP call, an invite is used in the control flow to setup the parameters for the data flow, or voice content of the call. When the call is completed, a tear down message is sent on the control flow to signal the end of the data flow. The network processing system of the present invention is able to link the control and data flows, in both directions, of these communications using the session state database. This allows search criteria present in the control flow to result in the data flow being intercepted by the network processing system. As stated, these abilities allow for monitoring of IP communications flowing over the network, either in whole, or for any subset of the communication such as call identifying information.

While the header preprocessor, the QoS processors, and the flow management processor described with reference to FIGS. 3 and 4 can be any suitable processor capable of executing the described functions, in the preferred embodiment the header preprocessor is the Fast Pattern Processor (FPP), the QoS processor is the Routing Switch Processor (RSP), and the flow management processor is the ASI processor, all manufactured by the Agere Division of Lucent Technologies, Austin Tex. The microprocessor described with reference to FIG. 3 and the management module of FIG. 4 could be any suitable microprocessor including the PowerPC line of microprocessors from Motorola, Inc., or the X86 or Pentium line of microprocessors available from Intel Corporation. Although particular references have been made to specific protocols, implementations and materials, those skilled in the art should understand that the network processing system, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A network processing system for use in a network and operable to intercept communications flowing over the network, the network passing a plurality of data packets, which form a plurality of flows, the network processing system comprising:

a learning state machine operable to identify characteristics of one or more of the flows and to compare the characteristics to a database of known signatures, one or more of the known signatures representing a search criteria, wherein when one or more characteristics of one or more of the flows matches the search criteria the learning state machine intercepts the flow and replicates the flow, redirecting the replication to a separate address.

2. The network processing system of claim 1 wherein only the identifying information of the flow is intercepted.

3. The network processing system of claim 1 wherein the entire contents of the flow are intercepted.

4. The network processing system of claim 1 wherein the communication to be intercepted has a control flow and a data flow.

5. The network processing system of claim 4 wherein a characteristic of the control flow matches the search criteria resulting in both the control flow and the data flow being intercepted.

6. The network processing system of claim 1 wherein the intercepted flow is a voice over IP call.

7. The network processing system of claim 1 wherein the learning state machine includes a header preprocessor for examining header information in the packet, a content processor for comparing the packet to the database and determining a treatment, and a quality of service processor for modifying the packet and directing the packet according to the treatment.

8. The network processing system of claim 7 wherein each learning state machine further includes a microprocessor for data packets that require additional processing.

9. A network processing system for use in a network, the network consisting of multiple flows each flow formed by multiple data packets, the network processing system operable to intercept selected flows in the network and comprising:

a learning state machines further comprising:
a traffic flow processor processing the data packets to associate each data packet with a particular flow, to maintain state for each flow, and to compare one or more flows to a database of known signatures, the data base of known signatures including predetermined search criteria such that a match with the predetermined search criteria within the database of known signatures causes the network processing system to monitor the flow;

a quality of service processor communicating with the traffic flow processor, the quality of service processor operable to assign the data packets into a quality of service queue corresponding to the associated flow.

10. The network processing system of claim 9 wherein the monitoring of the flow includes making a record of call identifying information.

11. The network processing system of claim 9 wherein the monitoring of the flow includes replicating the flow and sending the replicated flow to a predetermined IP address.

12. The network processing system of claim 9 wherein the traffic flow processor is comprised of a header preprocessor and a content processor, the header preprocessor operable to examine header information for each packet, and the content processor operable to compare the packet with the database of known signatures.

13. The network processing system of claim 9 wherein the state includes information concerning the characteristics of the flow as well as a record of events contained in the flow.

14. The network processing system of claim 9 wherein the state existing for the particular flow at the time a new packet belonging to the particular flow is examined, is used in conjunction with the database to determine whether the flow matches the predetermined search criteria.

15. The network processing system of claim 9 wherein the database of known signatures including the predetermined search criteria is programmed using a management interface on a separate server and downloaded into the network processing system in the form of an image file.

16. The network processing system of claim 15 wherein the management interface also acts to retrieve monitoring records from the network processing system.

* * * * *